Jan. 28, 1958  W. KOENIG, JR  2,821,683
WAVEFORM DISTORTION COMPENSATOR
Filed Nov. 25, 1952
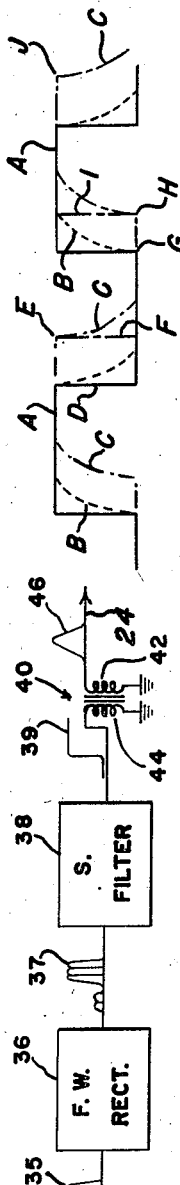
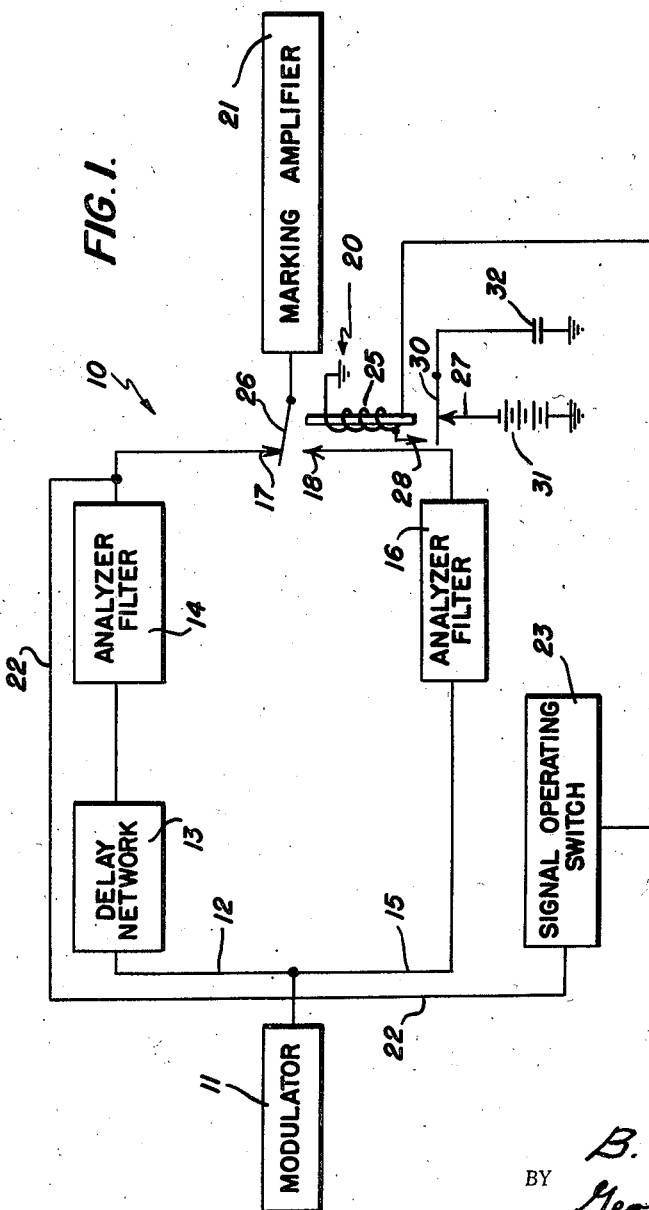
INVENTOR
WALTER KOENIG, JR.
BY B. L. Zanguill
George Sipkin
ATTORNEYS

United States Patent Office 2,821,683
Patented Jan. 28, 1958

2,821,683

WAVEFORM DISTORTION COMPENSATOR

Walter Koenig, Jr., Clifton, N. J., assignor, by mesne assignments, to the United States of America as represented by the Secretary of the Navy Application November 25, 1952, Serial No. 322,423

6 Claims. (Cl. 324—77)

This invention relates to circuit networks for use with receivers of a type that receive modulated signals such as are used, for example, in spectrographs; and more particularly relates to circuit networks for smoothing out or compensating for undesirable discontinuities in the modulated signal of spectrographic apparatus.

Generally, a sound spectrograph is an instrument or system for analyzing and visually representing complex waves such as may be derived from particular voice frequencies. Such spectrographs frequently utilize signals that are modulated, or coded, by passage through time delay scrambling circuits which scramble them so that the main signal cannot be readily understood without the use of special receiving apparatus whose operation is correlated to the scrambling. When the signals are received they are converted to visual signals and analyzed. In conversion of speech waves which have been subjected to time delay scrambling, certain irregularities are introduced. If no provision is made to smooth out or compensate for the irregularities, the irregularities will cause indefinite and spurious visual representations.

An object of the invention is to provide a circuit network that is utilizable for sharpening amplitude modulated signals.

In accordance with a preferred application of the invention, a circuit network is provided for spectrographic work; the network having a pair of filter channels with a common input. The output ends of the channels are selectively connected to a utilization means, such as a marking amplifier, in such a manner that the output signals of the pair of filter channels is improved by neutralizing the blurring of the sharp modulations of signals that have been scrambled.

A further object of the invention is to provide a circuit network that can be used in a spectrograph to enable the spectrograph to give clearer pictures of speech which have been subjected to time delay scrambling.

Another object of the invention is to improve the output characteristics of a spectrograph, and particularly the visual representations of the spectrograph.

Other objects and features of the invention will become apparent to those skilled in the art as the disclosure is made in the following detailed description of a preferred embodiment of the invention as illustrated in the accompanying sheet of drawing in which:

Fig. 1 is a block diagram of a circuit of a preferred form of the invention;

Fig. 2 is a wave-form graph illustrating the operation of the circuit, the horizontal direction being representative of time, and the vertical direction of amplitude; and Fig. 3 is a block diagram of a typical signal operating switch employed in the embodiment of the invention illustrated in Fig. 1.

Referring now to the drawing, there is shown in Fig. 1, and indicated generally as 10, the output circuit of a sound spectrograph. It is to be noted that all of the components of the spectrograph and the means for representing visually the wave-form produced thereby, are not shown in the figures, since any suitable and known elements can be used, so that these elements are omitted from the drawing for the sake of simplicity.

The output circuit 10 comprises a modulator 11, of any well known design, by means of which electrical impulses, representative of scrambled sound waves, are commonly fed to the inputs of a circuit 12 and a circuit 15. The circuit 12 has serially connected therein a delay network 13 and a band or analyzer filter 14. The filter 14 is any familiar network of impedances and capacitances to give a desired filtering action, preferably band pass action. The circuit 15 includes a second band or analyzer filter 16 but no delay network. The filters 14 and 16 preferably have the same characteristics.

The outputs of filters 14 and 16 terminate in contacts 17 and 18, respectively, of a relay 20 which connects either one or the other of the filters to a marking amplifier 21. Connected to the output of filter 14 is a relay operating or kick circuit represented by a conductor 22 and switch 23 whose output in turn is connected by means of lead 24 to the operating coil 25 of the relay 20. The relay operating circuit is of any suitable type that provides a current in the conductor 24 during the time that the amplitude value of its input signal changes in level, as for example when sharp discontinuities appear at the output of the filter 14, and may be of the type illustrated in Fig. 3. In this circuit, an incoming signal 35 having a sharp change in amplitude level is rectified by a full wave rectifier 36, and appears as a signal 37 which is applied to a smoothing filter 38. The filter 38 converts the signal to a D. C. pulse as represented at 39 and this pulse is fed to a transformer 40. The secondary winding 42 of the transformer 40 puts out no voltage when there is a steady direct current flowing in the primary winding 44, i. e. when a steady or no signal state is found in the input 22. However, when a signal suddenly appears in the line 22 or a sudden discontinuity is present, the signal upon being rectified and filtered presents a change in the rate of current flow through the primary winding 44. As a result thereof, a surge of current or kick is produced, as indicated at 46, in the secondary winding 42 which is applied to the line 24. This output signal of the relay operating circuit will operate to energize the relay 20.

The relay 20 has, as has been pointed out hereinbefore, an energizing coil 25, and contacts 17 and 18, and also has an armature 26 which is connected to the marking amplifier 21. The armature 26 is normally biased into contact with the contact 17. Also forming part of relay 20 is a pair of contacts 27 and 28 which cooperate with relay armature 30, armature 30 is normally biased against contact 27. Connected between ground and contact 27 is a battery 31, and connected between armature 30 and ground is a condenser 32. Contact 28 is joined to relay coil 25, the operation of which will be more fully described hereinafter.

In operation, under normal conditions, the solid line A (Fig. 2) shows the output of the modulator when sharp discontinuities occur at regular intervals (such as in time delay scrambled signals). After passing through delay network 13 and filter 14, the wave is like line C. The output of filter 16 is shown by line B. It is to be noted that because of the delay network 13 and filters 14 and 16, the boundaries of wave-forms B and C are not as sharply vertical as that of the wave-form A. The output of filter 14 passes through contact 17 and armature 26 of relay 20 to be impressed upon marking amplifier 21.

It is to be noted that due to conditions imposed by the arrangement of the circuit elements shown, that any wave-forms from modulator 11 which are applied to filter 14 are somewhat delayed in point of time with respect to their application to filter 16 because of the delayed action of network 13.

It is obvious, then, that when a sudden momentary discontinuity occurs, such as represented by the vertical line D, it becomes manifest in the output of filter 16 before it becomes manifest on the output of filter 14. When it does become manifest on filter 14, as for example at point E, the decrease in amplitude operates the relay operating circuit 22, 23, 24, to cause the relay operating switch 23 to energize the coil 25. Coil 25 attracts the armature 26 whereby filter 14 is disconnected and the output of the recovered filter 16 is connected to the input of the marking amplifier by means of contact 18. At this point, however, there is no signal at the output of the filter 16 so that no signal is fed to the marking amplifier 21 as illustrated by the downward vertical line F.

When coil 25 is momentarily energized by switch 23 it will be noted that in addition to attracting armature 25 it also attracts armature 30 to close back contact 28 thereby acting to connect the holding circuit composed of battery 31 and condenser 32 to the relay. The condenser 32 is obviously fully charged because it has been connected to the battery 31. When, however, the condenser is connected to contact 28 the potential of the condenser is applied to the coil 25 to maintain it energized until the charge on the condenser leaks off through the coil. After a period of time, determined by the size of the condenser, which may be adjustable, the relay opens thereby letting armature 26 move into engagement with contact 17, and switching filter 14, which has now recovered, back to the input of the marking amplifier.

This time is adjusted to cause the relay 20 to become deenergized at a point close to point G at which point the amplitude of the signal restores. This restoration becomes immediately manifest on the output of filter 16 but this filter is no longer connected to the marking amplifier 21. However when it becomes manifest on the output of filter 14, at point H, the relay 20 is reenergized and connects the output of filter 16 to the marking amplifier 21 as indicated by the line I so that the full signal on the output of the filter 16 is applied to the amplifier.

The relay 20 becomes deenergized when the current in the output of filter 14 reaches a substantially steady value, and reconnects the filter 14 to the marking amplifier 21 which now receives a full signal from the filter 14 until the point J is reached whereupon the relay 20 is reenergized to repeat the process because point J corresponds to point E. Accordingly a wave is produced in the marking amplifier 21 having sharp changes corresponding to the original input wave on the conductors 12 and 15.

It is obvious that the foregoing apparatus is by way of illustration, and the apparatus operates in a similar manner with waves having discontinuities that are not exactly like those shown for the sake of simplicity of explanation.

Therefore, it can be clearly seen that the present invention offers a positive improvement over prior sound spectrograph circuits in that it gives a continuous output signal resulting in clear and distinct indications at the output of the system.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention as set forth in the appended claims.

What is claimed is:

1. A waveform distortion compensated filter arrangement comprising; a signal source; substantially identical first and second filter means; the significant time of distortion of each of said filter means on signal energy passing therethrough, each time said signal energy rises or falls sharply, being known; a delay network connected between the output end of said signal source and the input end of said first filter means; said delay network being operative to delay signal energy from said signal source for a period of time at least equal to said significant time of distortion of said filter means; the input end of said second filter means connected to the output end of said signal source; signal utilizing means; means including switch means normally connecting said signal utilizing means to the output end of said first filter means; and means connected between the output end of said first filter means and said means including switch means and operative in response to a sharp rise or fall in the output from said first filter means to cause said switch means to disconnect said signal utilizing means from the output end of said first filter means and to connect said signal utilizing means to the output end of said second filter means.

2. A waveform distortion compensated filter arrangement as defined in claim 1 wherein said means including switch means further includes means operative for holding each connection completed between said signal utilizing means and the output end of said second filter means for a time interval at least equal to said significant time of distortion.

3. A waveform distortion compensated filter arrangement comprising; a signal source; substantially identical first and second filter means; the significant time of distortion of each of said filter means on signal energy passing therethrough, each time said signal energy rises or falls sharply, being known; a delay network connected between the output end of said signal source and the input end of said first filter means; said delay network being operative to delay signal energy from said signal source for a period of time at least equal to said significant time of distortion of said filter means; the input end of said second filter means connected to the output end of said signal source; a single-pole double-throw switch having a first contact connected to the output end of said first filter means and a second contact connected to the output end of said second filter means and a contactor biased to engage said first contact, signal utilizing means connected to said contactor, means connected to the output end of said first filter means and coupled to said contactor to move said contactor into engagement with the output end of said second filter means in response to a sharp rise or fall in the output from said first filter means.

4. A waveform distortion compensated filter arrangement as defined in claim 3 wherein said means connected to the output end of said first filter means and coupled to said contactor further includes means operative for holding each engagement of said contactor with the output end of said second filter means for a time interval at least equal to said significant time of distortion.

5. A waveform distortion compensated filter arrangement comprising; a signal source; substantially identical first and second filter means; the significant time of distortion of each of said filter means on signal energy passing therethrough, each time said signal energy rises or falls sharply, being known; a delay network connected between the output end of said signal source and the input end of said first filter means, said delay network being operative to delay signal energy from said signal source for a period of time at least equal to said significant time of distortion of said filter means; the input end of said second filter means connected to the output end of said signal source; a single-pole double-throw switch having a first contact connected to the output end of said first filter means and a second contact connected to the output end of said second filter means and a contactor biased to engage said first contact; signal utilizing means connected to said contactor; magnetic means including an energizing coil means connected between the output end of said first filter means and said energizing coil for energizing said coil in response to a sharp rise or fall in the output from said first filter means to cause said contactor to disengage said first contact and to engage said second contact; and means for holding each engagement of said contactor with the output end of said second filter means for a time interval at least equal to said significant time of distortion.

6. A waveform distortion compensated filter arrangement comprising; a signal source; substantially identical first and second filter means; the significant time of distortion of each of said filter means on signal energy passing therethrough, each time said signal energy rises or falls sharply, being known; a delay network connected between the output end of said signal source and the input end of said first filter means; said delay network being operative to delay signal energy from said signal source for a period of time at least equal to said significant time of distortion of said filter means; the input end of said second filter means connected to the output end of said signal source; a single-pole double-throw switch having a first contact connected to the output end of said first filter means and a second contact connected to the output end of said second filter means and a contactor biased to engage said first contact; signal utilizing means connected to said contactor; magnetic means including an energizing coil, one end of said energizing coil being connected to a source of reference potential; means connected between the output end of said first filter means and the other end of said energizing coil for energizing said coil in response to a sharp rise or fall in the output from said first filter means; condenser means connected at one end to said source of reference potential; a direct current source connected at one end to said source of reference potential; a second single-pole double-throw switch having a first contact connected to the other end of said direct current source and a second contact connected to said other end of said energizing coil and a contactor connected to the other end of said condenser means and biased to engage said first contact of said second switch whereby said coil is adapted to be energized as a result of a sharp rise or fall in the output from said first filter and said magnetic means is operative to move said contactors out of engagement with said first contacts and into engagement with said second contacts respectively and said condenser means is operative to maintain the energization of said coil for a time interval at least as long as said significant time of distortion.

References Cited in the file of this patent

UNITED STATES PATENTS

| | | |
|---|---|---|
| 2,416,330 | Labin | Feb. 25, 1947 |
| 2,580,973 | Sueur | Jan. 1, 1952 |
| 2,629,000 | Olson et al. | Feb. 17, 1953 |